United States Patent [19]

Hartemann et al.

[11] Patent Number: 4,515,016
[45] Date of Patent: May 7, 1985

[54] ELASTIC SURFACE WAVE ACCELEROMETERS

[75] Inventors: Pierre Hartemann; Paul-Louis Meunier; Alain Jacobelli, all of Paris, France

[73] Assignee: Thomson-CSF, Paris, France

[21] Appl. No.: 505,174

[22] Filed: Jun. 17, 1983

[30] Foreign Application Priority Data

Jul. 2, 1982 [FR] France .................... 82 11657

[51] Int. Cl.³ .................... G01P 15/08; G01P 15/13
[52] U.S. Cl. .................... 73/517 R; 73/517 B; 310/329
[58] Field of Search .................... 73/517 R, 517 B; 310/313, 329

[56] References Cited

U.S. PATENT DOCUMENTS

| | | | |
|---|---|---|---|
| 3,233,465 | 2/1966 | Tolliver et al. | 73/517 R |
| 3,304,773 | 2/1967 | Rogallo | 73/862.68 |
| 3,848,144 | 11/1974 | Schissler | 310/313 B |
| 4,186,324 | 1/1980 | Hartzell | 73/517 B X |

Primary Examiner—James J. Gill
Attorney, Agent, or Firm—Cushman, Darby & Cushman

[57] ABSTRACT

An elastic surface wave accelerometer having a deformable structure, fixed at one end and providing at its free end a seismic mass. The deformable structure may be an open frame with a single post or a closed frame with two posts. The accelerometer can measure movement of a missile or that of a gravitational field.

14 Claims, 5 Drawing Figures

ELASTIC SURFACE WAVE ACCELEROMETERS

BACKGROUND OF THE INVENTION

The present invention relates to elastic surface wave accelerometers and more particularly to those having at least two oscillators connected to transducer means, located on two faces of a bending or deflecting structure having a fixed end. The transducer means are designed so as to excite and collect the elastic surface waves, whereof it is known that the propagation speed varies as a function of mechanical bending stresses. According to a first construction, the transducer means form a transmission line, whose time lag fixes the phase displacement of an oscillator loop. According to a second construction, the transducer means are placed in a resonant cavity having grids and are connected to electrical means for maintaining the oscillation of the cavity. The frequency representing the oscillation to be measured results from the subtraction of two oscillating frequencies, but the latter are subject to a thermal drift, which can falsify the measurement of weak accelerations. When the two oscillators are coupled, the oscillation of one of them can lead to the other oscillating at the same frequency. This phenomenon occurs when the natural frequencies of the two oscillators are very close. To combat this phenomenon, it is possible to move the oscillators apart, or adequately shift their oscillating frequencies, but then the compensation of the thermal drifts is not ideal. This type of problem is encountered in accelerometers, wherein the bending structure is a simple lamellar member fixed at one end. Thus, the transducer means overhang the two main faces of the lamellar member and for acceleration sensitivity reasons, said member only has a limited thickness. The mechanical assembly conditions of the lamellar member can lead to undesirable stresses at the fixing point. These stresses vary as a function of the ageing of the materials and their relaxation, which take place subsequent to the initial assembly.

Apart from the electrical disconnection and fixing problems referred to hereinbefore, there is also a problem of ensuring a measurement of the acceleration component to be measured. The use of a single bending lamellar member involves a perfectly symmetrical fitting of the seismic mass to ensure that the acceleration cannot give rise to torsional deformations of the said member. Thus, the torsional rigidity depends on the inertia moment of the cross-section of the lamellar member and the latter is not sufficient to oppose a torsional movement. The solution of the problem of the mechanical disengagement relative to the deformable structure can be envisaged, provided that the sensitivity of the accelerometer is not sacrificed. To this end, it is also necessary to carefully position the elastic surface wave measuring means, because it would not be advantageous to use the entire length of a bending beam for the circulation of the elastic surface waves. Thus, no matter whether a delay line or an elastic surface wave resonator is used, it must be borne in mind that each oscillator may only be excited on a single oscillation mode. If a significant length is given to a delay line or resonator, there is a risk of confining the modes to a point such that the selectivity of the transducers or the reflector grids not making it possible to ensure the desired monomode operation. In practice, this leads to elastic surface wave measuring means covering a distance of about 100 wavelengths at a frequency of approximately 100 MHz. The reduction in the resolution corresponding to a limitation of the range of the measuring means can be largely compensated by a better utilization of the bending stresses, on which depends the variation of the propagation speed of the elastic surface wave.

SUMMARY OF THE INVENTION

Thus, the present invention relates to an elastic surface wave accelerometer comprising a deformable structure, whereof one end is fixed and whereof the other end is provided with a seismic mass, said structure having two parallel measuring faces with a plane of symmetry perpendicular to the sensitive axis of the accelerometer, each of the said measuring faces have an area occupied by an elastic surface wave means, which detects the bending stresses produced by the component along said sensitive axis of the acceleration to be measured and which acts on the tuning frequency of an oscillator, said oscillator and its homologue being connected to a subtractive mixer, which produces a measuring signal, whose frequency represents the measurement of said component, wherein the said deformable structure has on either side of the said plane of symmetry, two lamelliform flexible elements surrounding a central recess extending from the fixed end to the seismic mass, said measuring faces being constituted by the surfaces of the elements equidistant of the said plane of symmetry.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

In the field covered by the invention, accelerometers exist which are based on the influence exerted on elastic surface waves by the bending stresses of an overhanging beam. According to a typical construction, the beam is a piezoelectric lamellar member, fixed at one end and provided with a seismic mass at its other end. When an acceleration is applied to the lamellar member and frame serving as a support for the latter and said acceleration acts along a measuring axis perpendicular to its two main faces, bending stresses can be detected along these faces by elastic surface wave measuring means. As a non-limitative example, said means comprise on each main face, a delay line formed by two interdigitated transducers which exchange elastic surface waves in a direction located at the intersection of the face and a bending plane containing the measuring axis of the accelerometer. Along their path, the elastic waves encounter a bending stress, which reduces intensity on moving away from the fixing point and said stress changes sign on changing face. On looping two oscillators via delay lines, on the two faces of the lamellar member, the oscillating frequencies undergo equal shifts of opposite signs, whose sum can be revealed by applying the electrical signals produced by the oscillators to a subtractive mixer.

According to a first aspect of the invention, the bending stressable structure has two lamelliform elements of constant thickness, surrounding in parallel a central recess. This arrangement can result from a splitting into two in which a single lamellar member of thickness 2e is subdivided into two halves by a median slot parallel to the main faces, the parts then being spaced from one another, whilst still remaining facing. This arrangement significantly increases the torsional rigidity and has advantages with respect to the sensitivity of the accelerometer in each of the two configurations which can be envisaged, namely open or closed deformable frame structures.

Figure 1:
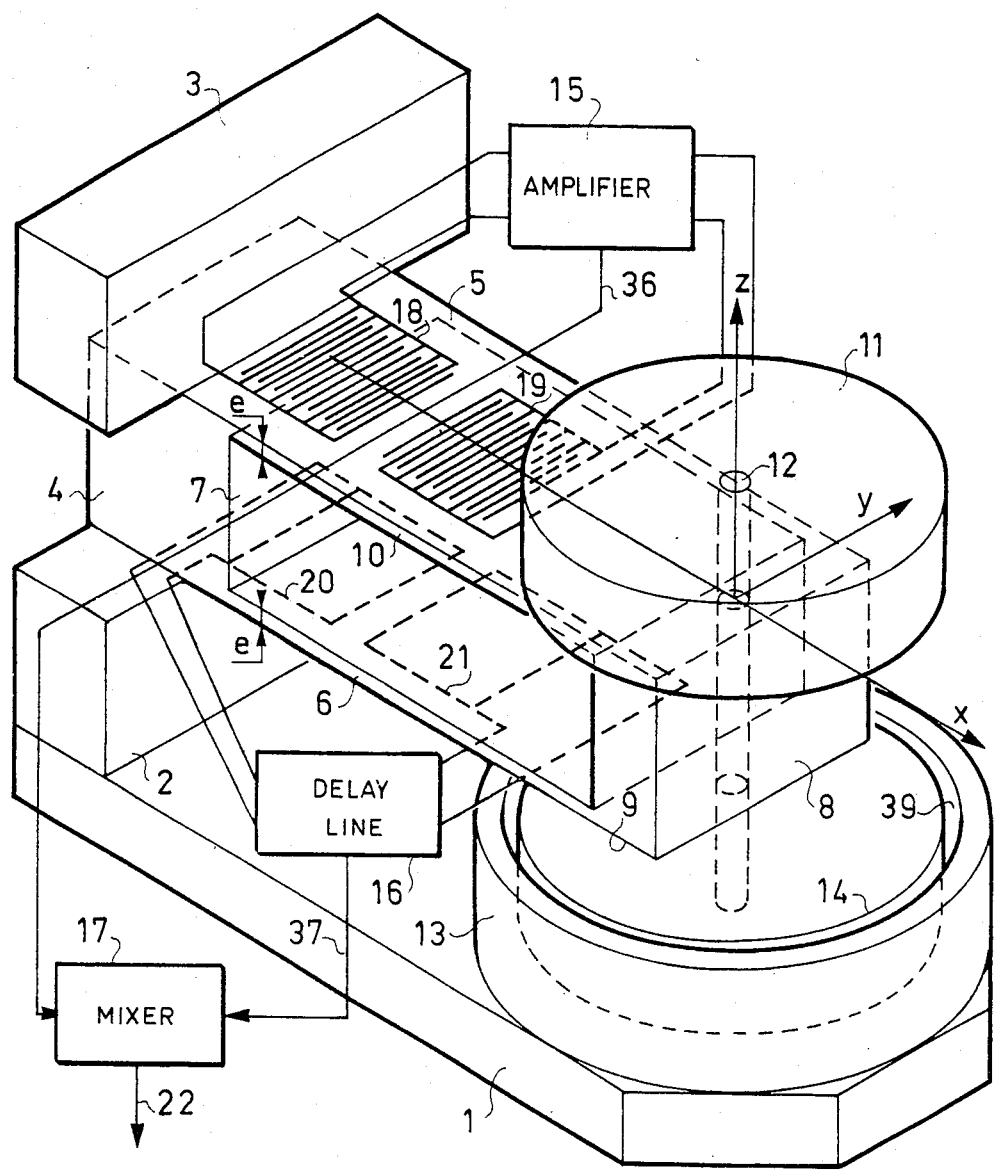
FIG. 1 an isometric view of an accelerometer according to the invention.

The accelerometer illustrated in FIG. 1 has a closed frame structure formed by two lamelliform elements 6 and 10 of thickness e, connected to their ends by two posts 4 and 8. As a non-limitative example, the structure of FIG. 1 can be obtained from a parallelepipedic quartz block, in which has been machined an also parallelepipedic recess 7. Machining is such that the elements 6 and 10 constituting the crossmembers of the frame can be linkened to two lamellar members of equal thickness e. The post 4 of the deformable frame is fixed to a frame 1 by means of two shims 2, 3, which cooperate with a not shown tightening means. Shim 3 can be surmounted by a not shown frame, but which has the same configuration as frame 1. The post 8 of the deformable structure has an opening giving passage to an assembly pin 12, whose projecting ends are fitted into two seismic masses 11 and 14. In FIG. 1, the seismic masses 11 and 14 are in the form of a circular cylindrical piston. Their vertical movement along axis Z, which is the acceleration measurement axis, can be damped by centering them in a cap 13 carried by frame 1. Cap 13 serves as the cylinder end, where the fluid compressed by the moving piston 14 can flow back through an annular calibrated space 39. The viscous damping resulting from this arrangement makes it possible to flatten the point of resonance of the deformable structure and can also serve as a displacement limiting means. The damping fluid can be the air expelled by the piston, or a viscous substance introduced into annular space 39. Between the seismic mass and the frame, it is also possible to provide a suspension-type connecting member for centering loudspeaker coils, which makes it possible to damp the mechanical resonance of the deformable structure in another way. Before continuing the description of FIG. 2, it is pointed out that the monolithic deformable structure can be cut from a non-piezoelectric material such as silica and that said structure can comprise an assembly of two lamellar members 6, 10 bonded to two blocks 4, 8 forming spacers. The solution which consists of cutting the deformable structure in the mass has the advantage of eliminating the mechanical stresses resulting from a non-homogeneous thermal expansion. To retain this advantage in the case of construction by separate bonded elements, during the cutting of the elements, it is necessary to use the same material and, when it is crystalline, to retain the crystallographic orientations for the assembly. The elastic surface waves of the mechanical stresses produced in the deformable structure by the acceleration to be measured can take place with either delay lines or grid resonators.

In FIG. 1, it has been assumed that the deformable structure is formed from a piezoelectric material having two polished faces 5 and 9, on which electrodes in the form of interdigitated transducers have been produced by the photogravure of a metallic layer. The transducers 18 and 19 carried by the faces form an elastic surface wave propagation delay line in direction x. Another identical delay line using transducers 20 and 21, whose external contours are sketched in the plane of face 9, is used for detecting the stresses on said face. With amplifier 15, delay line 18, 19 forms a first oscillator loop functioning at frequency $f_1$. With amplifier 16, delay line 20, 22 forms a second oscillator loop functioning at frequency $f_2$. The output terminals 36, 37 of the oscillator loops are connected to the inputs of a subtractive mixer 17, at whose output 22 there is a measuring signal, whose frequency represents the component of the acceleration to be measured along the sensitive axis z.

It is immediately apparent that undesirable electrostatic couplings between oscillator loops are greatly reduced as a result of the presence of recess 7, which can also be used as a shield by metallizing its periphery. Thus, the oscillator loops can function at very close frequencies, without any risk of making one dependent on the other.

Figure 4:
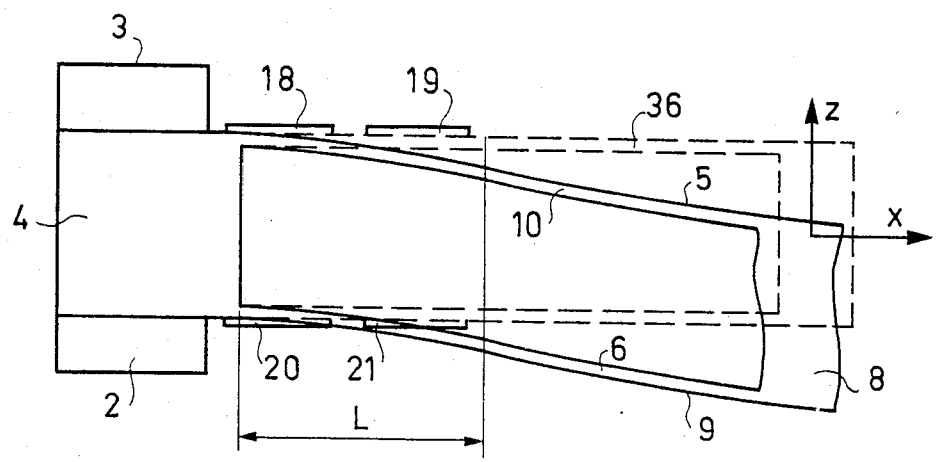
FIGS. 4 and 5 explanatory diagrams.

With regards to the stress detection mode, reference should be made to FIG. 4, which illustrates in highly exaggerated form, the deformation induced by the acceleration to be measured, when the deformable structure is a closed frame. The dotted line relates to the state of the undeformed structure and the unbroken line to the deformation produced by the acceleration. It can be seen that sides 6, 8 and 10 undergo an S-shaped deformation, so that face 5 has a convex shape to the left and a concave shape to the right. The situation is reversed with regards to face 9. The detection means 18, 19 and 20, 21 are disposed close to the fixing means 23 and the measuring zone containing the means has a length L which does not extend over the entire length of face 5. It is advantageous to limit the length L to the area of face 5 where the stress retains the same sign, because if said length is exceeded, the sensitivity of the accelerometer which integrates all the stresses detected can be reduced, as a result of the change of sign of the stress. Thus, the mean value of the stress on the path of the elastic surface waves must be at a maximum to obtain an optimum sensitivity which, in the frame-type structure used, means only using part of the overhanging length of the fitted structure.

For example, a closed frame structure machined from a quartz block can have a total length of 2 cm measured in direction x and a total height of 0.5 cm in direction z. The central recess 7 has a length of 1.4 cm and its height is chosen so that the thickness e of elements 10 and 6 is 0.06 cm. In all, the seismic masses 11 and 14 weigh 10 g, whilst the transducers 18, 19 are displaced by a few millimeters to establish the desired transmission delay. The oscillator loops operate at a frequency of approximately 100 MHz.

If the deformable structure is made from a non-piezoelectric material, a coating of piezoelectric material, such as zinc oxide, must be placed on the measurement faces 5 and 9, prior to the photoetching of the interdigitated transducers on said coating.

Figure 2:
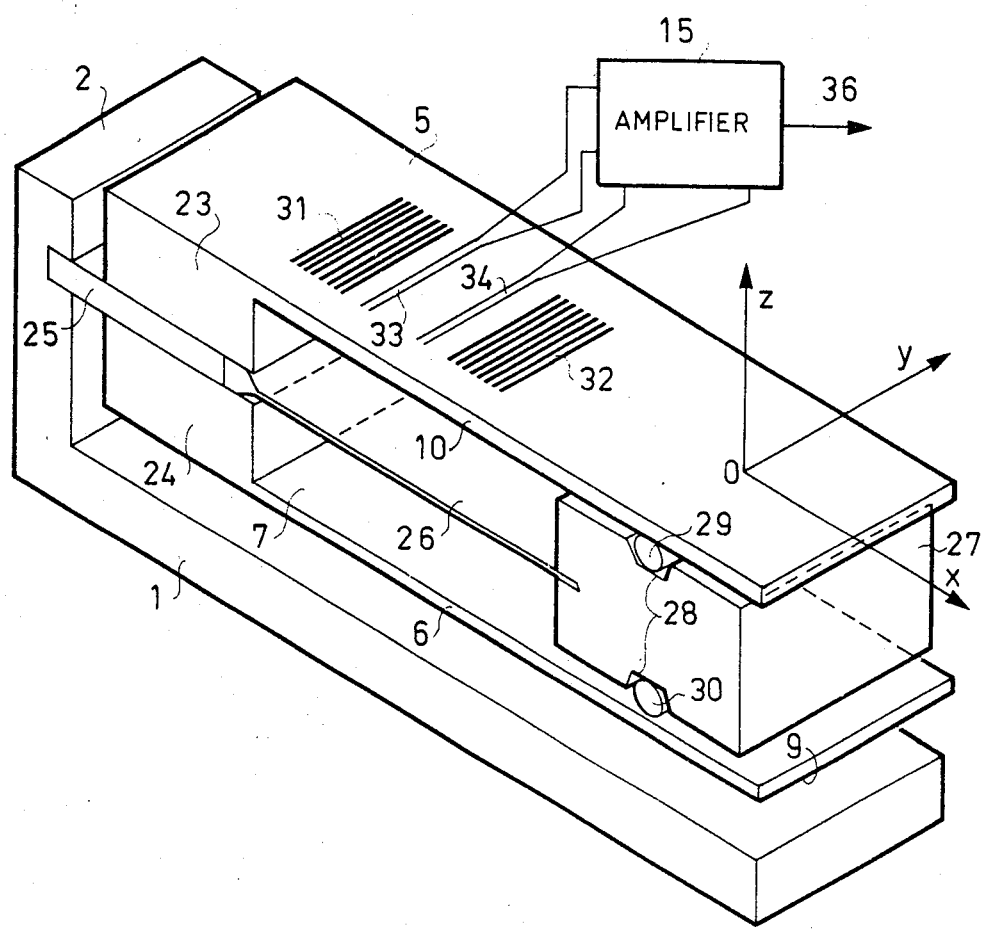
FIG. 2 an isometric view of a constructional variant of the accelerometer according to the invention.

FIG. 2 is an isometric view of a constructional variant of the elastic surface wave accelerometer. According to this variant, the deformable structure is an open frame, whose branches 6 and 10 are terminated by posts 24 and 23. The fixing of the moving equipment to frame 1 is ensured by a lamellar member 25, fitted into a web 2. The two posts 23, 24 grip member 25 on either side, as a result of securing or tightening means not shown in FIG. 2. As a variant, posts 23 and 24 can be fixed by bonding to the lamellar member 25.

Considered on an overall basis, the fitted deformable structure is a fork with two branches, whose free ends are coupled to a seismic mass 27, so as to transmit the inertia which bends the branches without producing an opposing torque, which would be the case with the overhanging post of a closed frame. To this end, the seismic mass has two flat-bottomed grooves 28, in which are respectively housed rollers 29 and 30. To maintain the contact between seismic mass 27 and branches 6 and 10, no matter what the acceleration direction to be measured, it is necessary to provide a prestressing of the deformable structure. To this end, the height of the stack constituted by elements 27, 29 and 30 is made greater than the spacing at rest of the outer faces of branches 6 and 10. The insertion of the stack causes the spacing apart of the branches and the maintaining in place of the seismic mass is ensured by a retaining strip 26, which connects said mass to the fixture.

The bending rigidity of the retaining strip 26 can be low compared with that of branches 5 and 10. The bending rigidity of the assembly of the two branches 6 and 10 is less than that of a single lamellar member of double the thickness or that of a closed frame using the same branches associated rigidly with two posts. Thus, the device according to FIG. 2 leads to a greater acceleration sensitivity, but the prestressing imposes a limit to the acceleration measurement range, because it is necessary that the contact is maintained under all circumstances at rollers 29 and 30.

Figure 5:
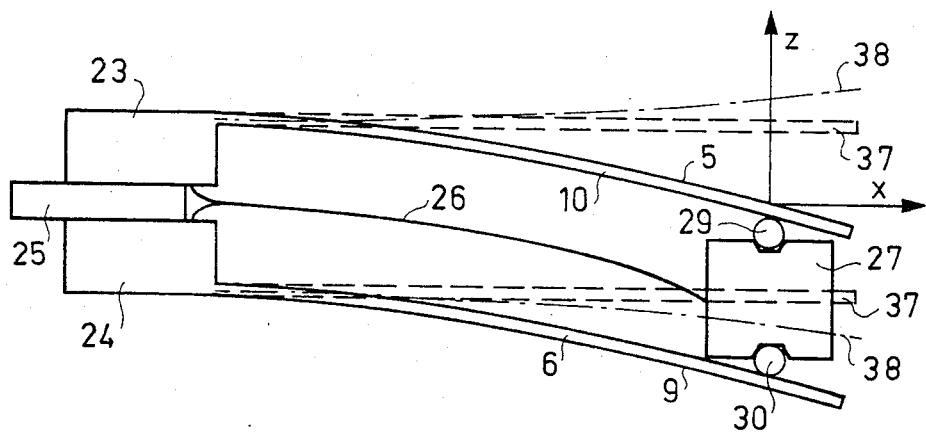

FIG. 5 illustrates the bending deformations involved in the case of a deformable structure, like that shown in FIG. 2. The fork, before prestressing, is shown in dotted line form by 37. Under the effect of the insertion of elements 27, 29 and 30, branches 6 and 10 follow the configuration of the mixed lines 38, where the prestressing deformation has been deliberately exaggerated. The continuous line represents the deformation by bending alone, resulting from an acceleration having a component along axis z.

With respect to the elastic surface wave stress detection means, FIG. 2 illustrates as a variant, a cavity resonator with reflector grids 31, 32. The lines of the grids are produced by machining or ion implantation. The oscillator loop comprises the amplifier circuit 15 associated with two transducers 33, 34, placed on cavity 31, 32 for exciting and detecting the standing surface waves, which fix the oscillating frequency of the loop as a function of the mechanical bending stresses.

Figure 3:
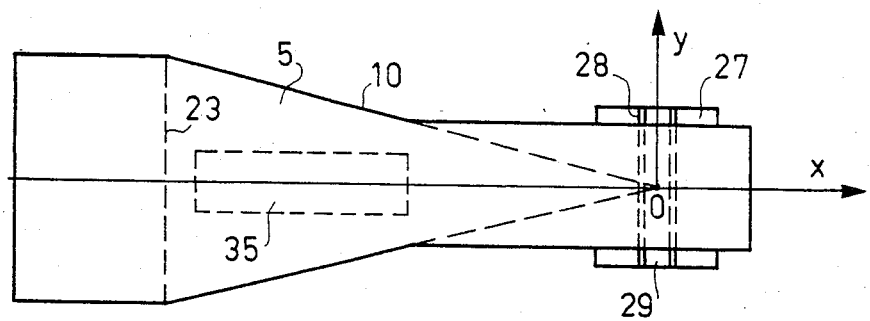
FIG. 3 a contructional detail applicable to the arrangements of FIGS. 1 and 2.

According to a constructional variant illustrated in FIG. 3, the two branches 6 and 10 can be given a form with equal bending resistance. The plan view of FIG. 3 shows that the contour of branch 10 widens in the direction of fixture 23, so that the deformation in the widened portion has a constant radius of curvature. The widened portion is the seat of uniform stresses, when the branch has a constant thickness. This is favourable to obtaining a better sensitivity and leads to easier construction, because the positioning of the detector means in the measuring zone 35 is not critical. The stresses are also made uniform with respect to the deformable structure of FIG. 1, although the equal resistance condition is more difficult to determine, In the case of FIG. 3, if the weight of branches 6 and 10 is taken as being negligible, the equal resistance signifies that the edges of the widened area intersect along two straight lines passing through the centre of gravity 0 of the seismic mass 27.

The aforementioned devices make it possible to obtain a good acceleration measurement sensitivity, whilst being relatively insensitive to thermal drift. Thus, a two-stage deformable structure is obtained, which has a first plane of symmetry located equidistantly of two bending lamellar members and which is oriented perpendicular to the measurement axis z. This structure can be produced symmetrically with respect to the bending plane containing the measurement axis, which further increases its symmetry. The closed frame solution eliminates the prestressing problems and brings about a good sensitivity, because the bending rigidity is lower than if there was only one instead of two lamellar members. Thus, it is known that the bending resistance of a post varies with the cube of the height.

To further increase the insensitivity to thermal drift, it is possible to use a measurement method based on the compensation of inertia. For this purpose, an electrodynamic force opposing the force of inertia is produced and by a feedback loop identical to that used in electronic balances, it is ensured that a zero deformation is maintained with the aid of a frequency comparator connected to accelerometer output 22. In the device of FIG. 1, moving coils can be added to the seismic masses 11 and 14 for producing the electrodynamic force. In this case, tank 13 assumes the form of a loudspeaker magnet. Due to the frame structure, the suspension ensures a displacement such that the axis of the moving coils remains parallel to axis z, which permits a precise guidance of the coils in the air gaps of the magnets. The opposite solution using moving magnets as the seismic masses and coils as the fixed part provides the supplementary advantage of having fixed electrical connections. The use of electrodynamic or electromagnet motors makes it possible to electrically damp the vibrations of the deformable structure and, if applicable, can prevent excessive displacements due to the appropriate electrodynamic braking.

It is finally pointed out that the closed frame structure is suitable for the installation of four elastic surface wave stress detectors. Two of these are placed in the manner shown in FIG. 1 in the vicinity of the fixed post 4, whilst the two others are arranged in the vicinity of the free post 8. Four oscillators are provided and are connected in pairs to first subtractive mixers. A third subtractive mixer receives the signals from the first two mixers. The oscillation frequency also is chosen so as to maximize the sensitivity to acceleration, whilst reducing the thermally caused frequency drift to the greatest possible extent.

What is claimed is:

1. An elastic surface wave accelerometer comprising a deformable structure, whereof one end is fixed and whereof the other end is provided with a seismic mass, said structure having two parallel measuring faces with a plane of symmetry perpendicular to the sensitive axis of the accelerometer, each of the said measuring faces have an area occupied by an elastic surface wave means, which detects the bending stresses produced by the component along said sensitive axis of the acceleration to be measured and which acts on the tuning frequency of an oscillator, said oscillator and its homologue being connected to a subtractive mixer, which produces a measuring signal, whose frequency represents the measurement of said component, wherein the said deformable structure has on either side of the said plane of symmetry, two lamelliform flexible elements surrounding a central recess extending from the fixed end to the seismic mass, said measuring faces being constituted by the surfaces of the elements equidistant of the said plane of symmetry and each lamelliform flexible element having a part widened towards the fixture which satisfies the condition of equal bending resistance.

2. An accelerometer according to claim 1, wherein the deformable structure is a closed frame in which the ends of the lamelliform flexible elements are connected to posts.

3. An accelerometer according to claim 1, wherein the deformable structure is an open frame, in which one of the ends of the lamelliform flexible elements is connected to a post forming a fixture.

4. An accelerometer according to claim 3, wherein the seismic mass is inserted, with prestress, between the free ends of the lamelliform flexible elements.

5. An accelerometer according to claim 4, wherein the seismic mass has a weight and two rollers located in flat-bottomed grooves of the said weight, the latter being connected to the fixed post by a retaining strip.

6. An accelerometer according to claim 3, wherein the fixed post has a central element, which is itself fitted into the web of a frame.

7. An accelerometer according to claim 2, wherein one of the posts is a fixed post, whilst the other post serves as a support for the seismic mass.

8. An accelerometer according to claim 7, wherein the seismic mass comprises two weights connected to the free leg by a spindle passing therethrough.

9. An accelerometer according to claim 1, wherein damping means are provided for decelerating the displacement of the free end of the fixed deformable structure.

10. An elastic surface wave accelerometer comprising a deformable structure formed as an open frame, whereof one end is fixed and whereof the other end is provided with a seismic mass, said structure having two parallel measuring faces with a plane of symmetry perpendicular to the sensitive axis of the accelerometer, each of the said measuring faces have an area occupied by an elastic surface wave means, which detects the bending stresses produced by the component along said sensitive axis of the acceleration to be measured and which acts on the tuning frequency of an oscillator, said oscillator and its homologue being connected to a subtractive mixer, which produces a measuring signal, whose frequency represents the measurement of said component, wherein the said deformable structure has on either side of the said plane of symmetry, two lamelliform flexible elements surrounding a central recess extending from the fixed end to the seismic mass, one of the ends of the lamelliform flexible elements being connected to a post forming a fixture, said measuring faces being constituted by the surfaces of the elements equidistant of the said plane of symmetry and said seismic mass being inserted with prestress between the free ends of the lamelliform flexible elements.

11. An accelerometer according to claim 10, wherein it has electrically controlled motive means applying a force opposing the inertia resulting from the acceleration to be measured to the free end of the fixed deformable structure, control means ensuring the electrical control in such a way as to cancel out the deformation of the deformable structure.

12. An accelerometer according to claim 10, wherein the lamelliform flexible element has a part widened towards the fixture which satisfies the condition of equal bending resistance.

13. An accelerometer according to claim 10, wherein the elastic surface wave measuring means is a delay line with electrodes in the form of interdigitated transducers or a resonator cavity with grids provided with electromechanical transducers.

14. An elastic surface wave accelerometer comprising a deformable structure, whereof one end is fixed and whereof the other end is provided with a seismic mass, electrically controlled motive means applying a force opposing the inertia resulting from the acceleration to be measured to the free end of the fixed deformable structure, control means ensuring the electrical control in such a way as to cancel out the deformation of the deformable structure, said structure having two parallel measuring faces with a plane of symmetry perpendicular to the semsitive axis of the accelerometer, each of the said measuring faces have an area occupied by an elastic surface wave means, which detects the bending stresses produced by the component along said sensitive axis of the acceleration to be measured and which acts on the tuning frequency of an oscillator, said oscillator and its homologue being connected to a subtractive mixer, which produces a measuring signal, whose frequency represents the measurement of said component, wherein the said deformable structure has on either side of the said plane of symmetry, two lamelliform flexible elements surrounding a central recess extending from the fixed end to the seismic mass, said measuring faces being constituted by the surfaces of the elements equidistant of the said plane of symmetry.

* * * * *